(12) United States Patent
Ritter et al.

(10) Patent No.: US 8,755,780 B2
(45) Date of Patent: Jun. 17, 2014

(54) APPARATUS, AND ASSOCIATED METHOD, FOR RECONNECTING DROPPED CALL

(75) Inventors: Eric Martin Ritter, Waterloo (CA); Brian Alexander Oliver, Fergus (CA); Joseph Patrick Thomas Goguen, Los Gatos, CA (US); Richard John George, Waterloo (CA)

(73) Assignee: Blackberry Limited, Ontario (CA)

( * ) Notice: Subject to any disclaimer, the term of this patent is extended or adjusted under 35 U.S.C. 154(b) by 121 days.

(21) Appl. No.: 13/354,410

(22) Filed: Jan. 20, 2012

(65) Prior Publication Data

US 2013/0189967 A1 Jul. 25, 2013

(51) Int. Cl.
*H04M 3/42* (2006.01)

(52) U.S. Cl.
USPC ........ 455/416; 455/414.1; 455/417; 455/425; 379/201.01; 379/202.01

(58) Field of Classification Search
USPC ........... 455/416, 417, 445, 424, 67.11, 414.1; 379/201.01, 202.01; 370/260
See application file for complete search history.

(56) References Cited

U.S. PATENT DOCUMENTS

| | | | | |
|---|---|---|---|---|
| 6,032,040 | A * | 2/2000 | Choy et al. | 455/414.1 |
| 6,275,713 | B1 * | 8/2001 | Toda | 455/564 |
| 6,993,360 | B2 * | 1/2006 | Plahte et al. | 455/555 |
| 7,187,923 | B2 * | 3/2007 | Mousseau et al. | 455/416 |
| 7,228,145 | B2 * | 6/2007 | Burritt et al. | 455/519 |
| 8,068,824 | B2 * | 11/2011 | Shan et al. | 455/417 |
| 8,238,537 | B2 * | 8/2012 | Gisby et al. | 379/202.01 |
| 8,494,503 | B2 * | 7/2013 | Winter et al. | 455/416 |
| 8,542,810 | B2 * | 9/2013 | Carr et al. | 379/202.01 |
| 2002/0090947 | A1 * | 7/2002 | Brooks et al. | 455/436 |
| 2005/0048981 | A1 * | 3/2005 | Anupam et al. | 455/445 |
| 2007/0232284 | A1 * | 10/2007 | Mason et al. | 455/416 |
| 2007/0274488 | A1 * | 11/2007 | Callaghan | 379/201.01 |
| 2008/0037746 | A1 * | 2/2008 | Dufrene et al. | 379/201.01 |
| 2008/0081627 | A1 * | 4/2008 | Shan et al. | 455/445 |
| 2010/0067680 | A1 * | 3/2010 | Hanson et al. | 379/202.01 |

FOREIGN PATENT DOCUMENTS

EP 1480427 A1 11/2004

* cited by examiner

*Primary Examiner* — Sharad Rampuria
(74) *Attorney, Agent, or Firm* — Wolff & Samson PC

(57) ABSTRACT

An apparatus, and an associated method, reconnects a communication party, such as a wireless device, into a call connection responsive to detection of a call connection drop of an ongoing communication session. A detector detects a call connection drop of an ongoing communication session. And, responsive to the detection, the connection is automatically reinitiated.

17 Claims, 3 Drawing Sheets

APPARATUS, AND ASSOCIATED METHOD, FOR RECONNECTING DROPPED CALL

The present disclosure relates generally to a manner by which to reconnect a dropped call. More particularly, the present disclosure relates to an apparatus, and an associated method, by which to determine that a call termination is the result of a dropped call and not an intentional call termination and, upon such determination, to reconnect the call.

BACKGROUND

Radio communication systems are utilized by many through which to communicate. Improved communication mobility is provided when a communication service is carried out by way of a radio communication system as radio channels are utilized to communicate communication data.

Many varied, communication services are carried out with, and by, a wireless device operable in a radio communication system. A wireless device is often times capable of providing, for instance, any of various telephonic communication services including, e.g., voice, video, multi-media, and data communication services.

A radio channel, however, is susceptible to environmental, and other, factors that distort are sometimes difficult to correct or overcome. Fading conditions on the radio communications channel, co-channel interference, and adjacent-channel interference are amongst the causes of distortion to communication upon a radio channel. While such distortion is not unique to radio communication systems, such distortion is sometimes more difficult to prevent upon a radio communication channel. The distortion distorts the communicated information. And, if too significant, the communication of data pursuant to the communication service might be terminated. Such termination shall, at times, be referred to herein as a call drop.

Reconnection of a communication connection is typically required to continue the communication service subsequent to the communication-service termination. Reconnection, if initiated by a user of the wireless device typically requires the user manually to enter reconnect instructions. The reconnect instructions include, e.g., a contact identifier, such as a phone number or URL (Uniform Resource Locator) or other entered data forming a command that causes reconnection of the dropped call. If the phone number, URL, or other data is not readily available to the user, this procedure required of the user. The user of the wireless device typically is required to obtain and then enter the dialing digits or other contact identifier associated with the other communication party or otherwise enters a command to reconnect the call. If the contact identifier is not readily available, this procedure required of the user of the device can quickly become frustrating.

DETAILED DESCRIPTION

Figure 1:
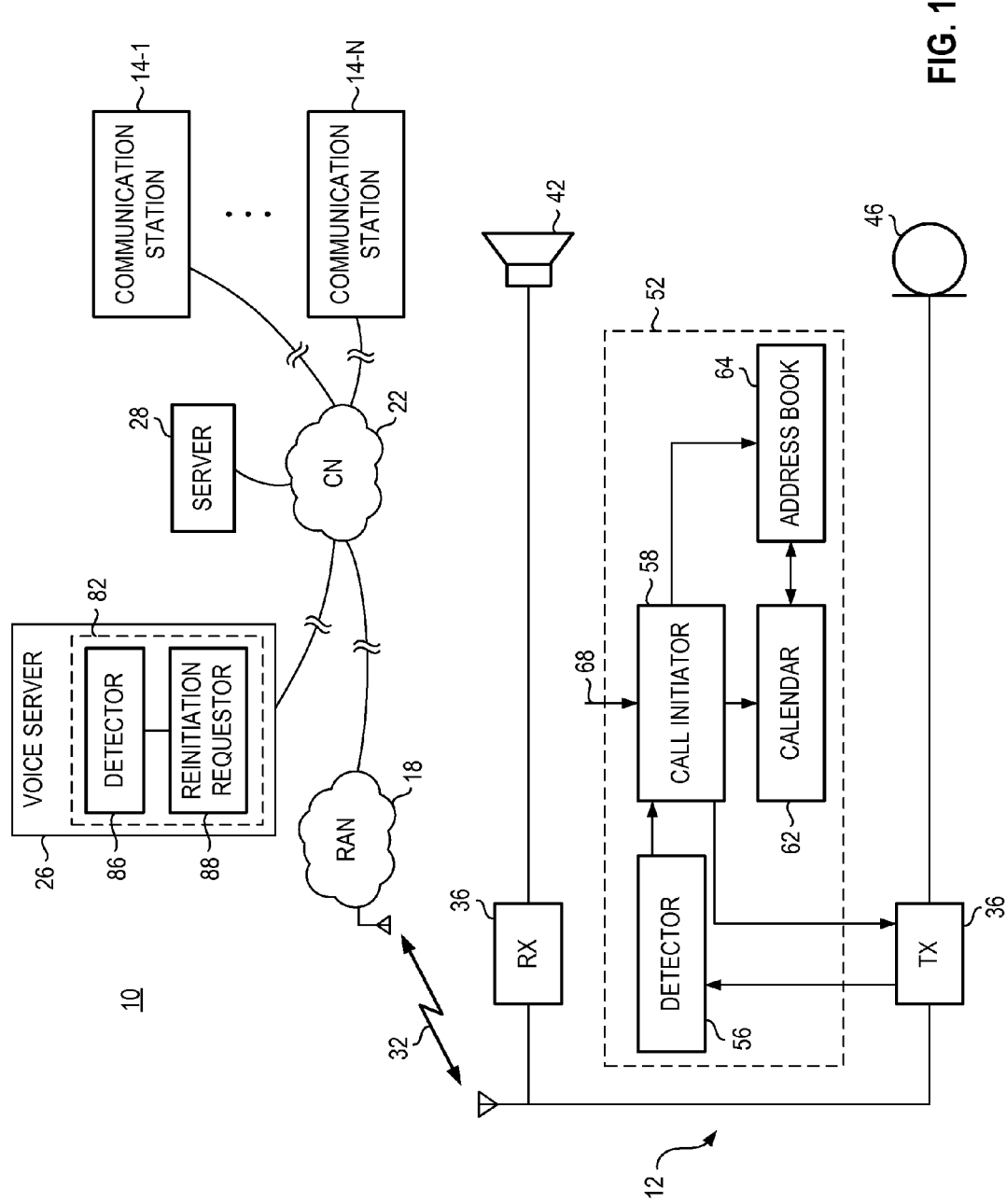
FIG. 1 illustrates a functional block diagram of a radio communication system in which an implementation of the present disclosure is operable.

The present disclosure, accordingly, advantageously provides an apparatus and an associated method that reconnects a call connection of a dropped call.

In accordance with an aspect of the present disclosure, a manner is provided by which to determine that a call termination is the result of a dropped call and then to reconnect the call if the call is determined to have been dropped.

In another aspect of the present disclosure, improved perception of communication-system performance is provided as a party to a communication session whose call has been dropped is automatically reconnected to the communication session. Because the reconnection is automatically initiated, a search for a telephone number or other contact identifier and subsequent entry of the contact identifier or commands to reconnect the call is not needed to be made.

In another aspect of the present disclosure, detection is made of a dropped connection of an ongoing communication between a set of communication parties. The call connection drop, is a termination of communications with a party to the communications that is not intended, as contrasted to an intentional termination of the call by a party to the call. That is to say, a call connection drop is any end of a call that occurs for any reason other than a call termination intended by a party to the call.

In another aspect of the present disclosure, detection is made of a normal call termination of an ongoing call. The normal call termination is a termination of the communications that is made at a party to the communications, such as a party intentionally terminating the ongoing communications, that is to say, intentionally ending the call. Detection is made of a normal call termination made by any of the parties to the communication. That is to say, detection is made of a local call termination or a remote call termination.

In another aspect of the present disclosure, the detection of the call drop is made by detecting communication termination that is not a normal call termination made by a party to the ongoing communications. That is to say, detection is made of a call connection drop that occurs absent detection of a normal call termination.

In another aspect of the present disclosure, initiation of a reconnection of the call is undertaken responsive to detection of the call connection drop. The reinitiation of the call connection is undertaken automatically responsive to the detection of the call connection drop. No manual initiation or entry of information is required to commence with the telephonic-call reinitiation.

In another aspect of the present disclosure, the call comprises a two-party call, i.e., a communication session between a pair of communication parties. A call connection is reinitiated upon detection of a call connection drop between the two communication parties. The reinitiation of the call connection is undertaken automatically, without user action responsive to the detection of the call connection drop.

In another aspect of the present disclosure, the call comprises a multi-party call, that is, a communication session between more than two communication parties. A call connection is reinitiated upon detection of a call connection drop of the communications with the dropped party. The reinitiation of the communication connection is undertaken automatically without user action responsive to the detection of the call connection with the dropped party.

In another aspect of the present disclosure, the call connection is reinitiated utilizing the contact identifier associated with a remote party, i.e., the other communication party in a two-party communication session. The contact identifier comprises, e.g., the last-entered dialing digits or last entered SIP URI, entered by a communication party if the communication session was initiated locally. Or, if the communication session was initiated remotely, and the ongoing call that was terminated was initiated by a remote party, the dialing digits that are used to reinitiate the communication comprise a last-received number or identifier, such as dialing digits or SIP URI received pursuant to a terminating call set-up.

In another aspect of the present disclosure, the dropped call connection is a dropped call connection of a conference call that utilizes a conference bridge number or identifier. Call reconnection is initiated using the conference-bridge number or other identifier and conference-entry code, if needed.

In another aspect of the present disclosure, the conference-bridge number or identifier and entry code are obtained by accessing a calendaring function at which the information is stored. For instance, a user calendars the conference-call information is calendared in a calendar function of the telephonic device, or elsewhere. And, when the time of the conference call arrives, the information is used pursuant to the initial call connection and, if a call connection drop occurs, the information is again accessed and used to reconnect to the conference bridge.

In another aspect of the present disclosure, the communication device is positionable in communication connectivity with a network server, such as an enterprise voice server. Upon detection of the call connection drop, the communication device communicates with the server, and the server reinitiates the conference-call connection with the conference bridge.

Thereby, because the call connection is automatically initiated upon detection of a call connection drop, the reconnection of the communication connection of the call is more easily made.

In these and other aspects, therefore, an apparatus, and an associated method, is provided for facilitating a call reconnection. A detector is configured to detect a call connection drop of an ongoing call. A call initiator is configured automatically to reinitiate formation of the call connection responsive to detection by the detector of the call connection drop of the ongoing call.

Turning first, therefore, to FIG. 1, a communication system, shown generally at 10, provides for communications with communication devices, such as the wireless device 12 and communication stations 14. Two-party, multi-party telephonic communication sessions of voice, video, multi-media, and data, are provided during operation of the communication system. In the exemplary implementation, the communication system comprises a radio communication system, such as a cellular radio communication system operable in general conformity with the operating protocols of a cellular communication system standard. More generally, the communication system 10 is representative of any of various communication systems, both wireless and wire line, that provide for communication services between communication parties. While the following description of exemplary operation shall be described with respect to the exemplary implementation, operation of a communication system implemented in other manners can be analogously described.

The communication system 10 includes a network part, here comprising a radio access network (RAN) 18 and a core network (CN) 22. The communication stations 14, here communication stations 14-1 and 14-n are placed in communication connectivity with the core network 22. Other communication devices are also placeable in communication connectivity with the core network, such as an enterprise voice server 26 and a conferencing server 28. The communication entities 12, 14, and 26, as well as others, are capable of communication with others of the communication entities. For example, a telephonic communication session is formable between the communication station 14-1 and the wireless device 12. Or, a multi-party, telephonic communication is formable between more than two of the communication entities, here, for example, the communication stations 14-1, 14-n, and wireless device 12. Communication connections are made between the wireless device and one or more of the communication parties formed of the communication stations 14 by communication pads formed through the core network 22, radio access network 18, and radio channels 32, represented by the arrow in the Figure, defined upon a radio air interface formed between the network part and the wireless device.

The wireless device 12 includes radio transceiver circuitry, here represented by a receive (Rx) part 36 and a transmit (Tx) part 38. The wireless device includes a user interface, here including an output transducer forming a speaker 42 and an input transducer forming a microphone 46. For example, a voice, telephonic communication service is carried out with a user of the wireless device in which received information, received by the receive part 36 is converted into acoustic form by the speaker 42. And, speech information provided by the user is converted into electronic form by the microphone 46 and caused to be transmitted by the transmit part 38.

Normal voice and other telephonic communication services such as the aforementioned video, multi-media, and data services, are performed by forming a communication connection between the appropriate communication parties to carry out a telephonic communication service. In a conventional voice call, a call is originated by one of the communication parties, i.e., the calling party, and the call is terminated at another of the calling parties, i.e., the called party. When a multi-party, communication session is formed, such as a conference call, communication connections are formable by way of a conference bridge, such as a conference bridge formed by the conferencing server 28, which forms the communication connections for the multi-party conference call.

The calling party enters dialing digits associated with the called party and call-set-up procedures are performed to form the call connection. When a conference call is created utilizing a conference bridge, the communication parties that are to be part of the conference call enter dialing digits SIP URI, or other contact information of the conference bridge, and the conference bridge provides for the formation of the appropriate communication connections to form the conference call.

As mentioned previously, call connections are sometimes dropped between the communication parties, particularly in radio communication systems due to distortion and other communication anomalies. In general, a call drop is considered herein to be any call termination that is not caused by call termination at one of the communication parties, such as by a party actuating a call-end button to purposefully or intentionally end the call. When a call connection is dropped, conventionally, the dropped party is reconnected into the call by a user manually entering the contact information, e.g., the dialing digits or the SIP URI, of the other party, to reinitiate communications.

The present disclosure facilitates reconnection of communication connection of a communication party whose connection to an ongoing communication session, i.e., an ongoing call, has been dropped. The reconnection is carried out automatically without requiring any manual entry of information. In another embodiment, a control circuit is configured to reinitiate the call connection responsive to a network-acceptability level exceeding a threshold.

The wireless device 12 includes an apparatus 52 of an implementation of the present disclosure. The apparatus 52 facilitates the reconnection of the communication party, formed of the device 12, subsequent to drop of a communication connection. The apparatus 52 is functionally represented, formed of functional elements that are implemented in any desired manner including, for instance, hardware elements, firmware elements, algorithms executable by processing circuitry, and combinations thereof.

The apparatus 52 here includes a detector 56, a call initiator 58, a calendar 62, and an address book 64. The elements of the apparatus, in the exemplary implementation, the elements of the apparatus are all embodied at the device 12. In other implementations, functionality of one or more of the elements of the apparatus 52 are implemented separate from the wireless device and are accessible during operation of the apparatus. Additionally, while, in the exemplary implementation, the apparatus 52 is embodied at the wireless device 12, in other implementations, the apparatus is implemented at communication parties formed of other types of devices.

The detector 56 is operable to detect a call connection drop. The detection is made by, for example, detecting end of a communication connection absent detection of conventional termination of communications by a calling party that is a party to the ongoing communication session. The detector operates in this regard to detect such a conventional termination, such as a remote termination at a remote calling party or a termination made by the local communication party, here the wireless device 12. Such detection made by the detector 56 is indicative of a call connection drop resulting in a call termination that is not intended by the parties.

Detection made by the detector 56 is provided to the call initiator 58. The call initiator operates to reinitiate formation of a communication connection, a telephonic call connection, with the other communication party or parties. The call initiator, in one implementation, operates to reinitiate the call connection if communication conditions are permitting of formation of a call connection. The arrow 68 is representative of information provided to the call initiator pertaining to communication conditions. If communication conditions are considered to be adequate, the call initiator, responsive to the detection made by the detector, causes call reinitiation. The line 72 is representative of commands generated by the call initiator to cause the transmit part of the device 12 to reinitiate a call connection.

In one implementation, the device 12 is operated in a manner that conforms with a communication policy set by an enterprise or other entity. For instance, the wireless device 12 is here operable in conformity with policy set by an enterprise operator that operates the enterprise voice server 26. Policies, and policy changes, are provided to the wireless device including by way of signals caused to be sent by the voice server to the wireless device 12. The policies include, for instance, a policy pertaining to operation of the apparatus 52 automatically to reconnect a dropped call connection. In another implementation, operability of the apparatus 52 is dependent upon selection made at the wireless device to operate the apparatus in the manner to automatically reconnect the call connection upon detection of a call drop.

In the exemplary implementation, the call initiator 58 obtains the dialing digits of a remote communication party and uses the dialing digits in the call reconnection. The calling digits, SIP URI (Session Initiation Protocol Uniform Resource Identifier), or other contact identifier if the original call was originated at the device 12, are the last-entered identifiers entered at the wireless device. Or, if the call was originated elsewhere and terminated at the device 12, the identifier comprises the identifier of the last-received telephone number. Call initiation is carried out automatically without need for user of the device 12 to commence the call reinitiation.

The apparatus 52 also operates to reconnect the device 12 to a conference call connection, which ends for any unplanned reason including, e.g., timeout of the conference bridge. The call initiator, e.g., accesses calendar information maintained by the calendar functionality or at the address book 64 that identifies the conference-call, dialing code and entry code information. Or, the dialing digits, or other identifier, are obtained using the last-entered identifier. In an implementation that utilizes the calendar information, a programmatic check of the calendar function, such as by day and time of the call drop, is performed to determine if the dropped call was a conference call. In this implementation, if there is no calendar information related to a conference call, the last-entered identifiers are used to reinitiate the call connection. When dialog digits are utilized, extdigits associated with entry or access codes, are also identified and used in the call reinitiation. For instance, if the last-entered dialing digits comprise the digits 1866551212 followed by 555555#, then these digits are used to reinitiate the call connection.

In an alternate implementation, the conference-call connection is reinitiated through action taken by further apparatus 82 of an implementation of the present disclosure. The apparatus 82 is embodied at the server 26 or other appropriate network location. The elements of the apparatus 82 are functionally represented, implemented in any desired manner, and are also, e.g., formed of hardware elements, firmware elements, algorithms executable by processing circuitry, and combinations thereof.

The apparatus 82 is here formed of a detector 86 and a call reinitiation requestor 88.

In this implementation, when detection is made that the call connection with the communication party formed of the wireless device 12 is dropped, the call initiator 58 causes a message to be sent by the wireless device 12 to the server 26. The detector 86 detects the delivery at the server of the wireless-device-transmitted signal. The signal comprises, for instance, a data packet that is routed to the server 26. The packet identifies the occurrence of the call drop at the wireless device. The signal acts to instruct the server to make a call for the user to the conference bridge number or identifier. No action is required of a user of the wireless device to initiate the call or to answer a subsequent inbound call as, instead, a data packet is sent to inform the wireless device that the resultant call should be answered or initiated automatically based off of the call direction configured by the server. The user of the device 12 also is not required to enter an access code pursuant to the reconnection into the conference call as this information is in the original call request and is dialed or otherwise entered automatically.

The call reinitiation requestor 88, in response to detection by the detector of the signal, causes reinitiation of the conference call connection of the wireless device 12 by placing a call to the conference bridge on behalf of the wireless device and causing a call placement to the wireless device to complete the reconnection of the call connection into the conference call connection.

In an alternate implementation, when the conference bridge is compatible, the wireless device initiates a data signal that is sent to the server 26. And, the server, in turn, formats a message to the conference bridge to inform the conference bridge of the dropped call connection and that the conference bridge should call the wireless device. The default line, i.e., number, that is selected at the time of the call connection drop is the number that the conference bridge is instructed to call back. The conference bridge is also notified in the message that the call is a dropped, participant return call and that when the call reconnection is made, audio tones are not to be generated, nor other audio information, thereby to provide for seamless rejoining of the conference call. The user of the wireless device is not required to answer the inbound call as the call is properly identified as the conference bridge calling and the call is automatically answered. And, the user also need not enter an access code as the conference bridge makes the call to the wireless device.

In a further implementation, previous call state and audio method is preserved when the call is connected. For instance, if the call, prior to the call drop is muted, the rejoined call is also muted. And, for example, if the call connection prior to the call drop used an Bluetooth audio path, the same path is again utilized.

Figure 2:
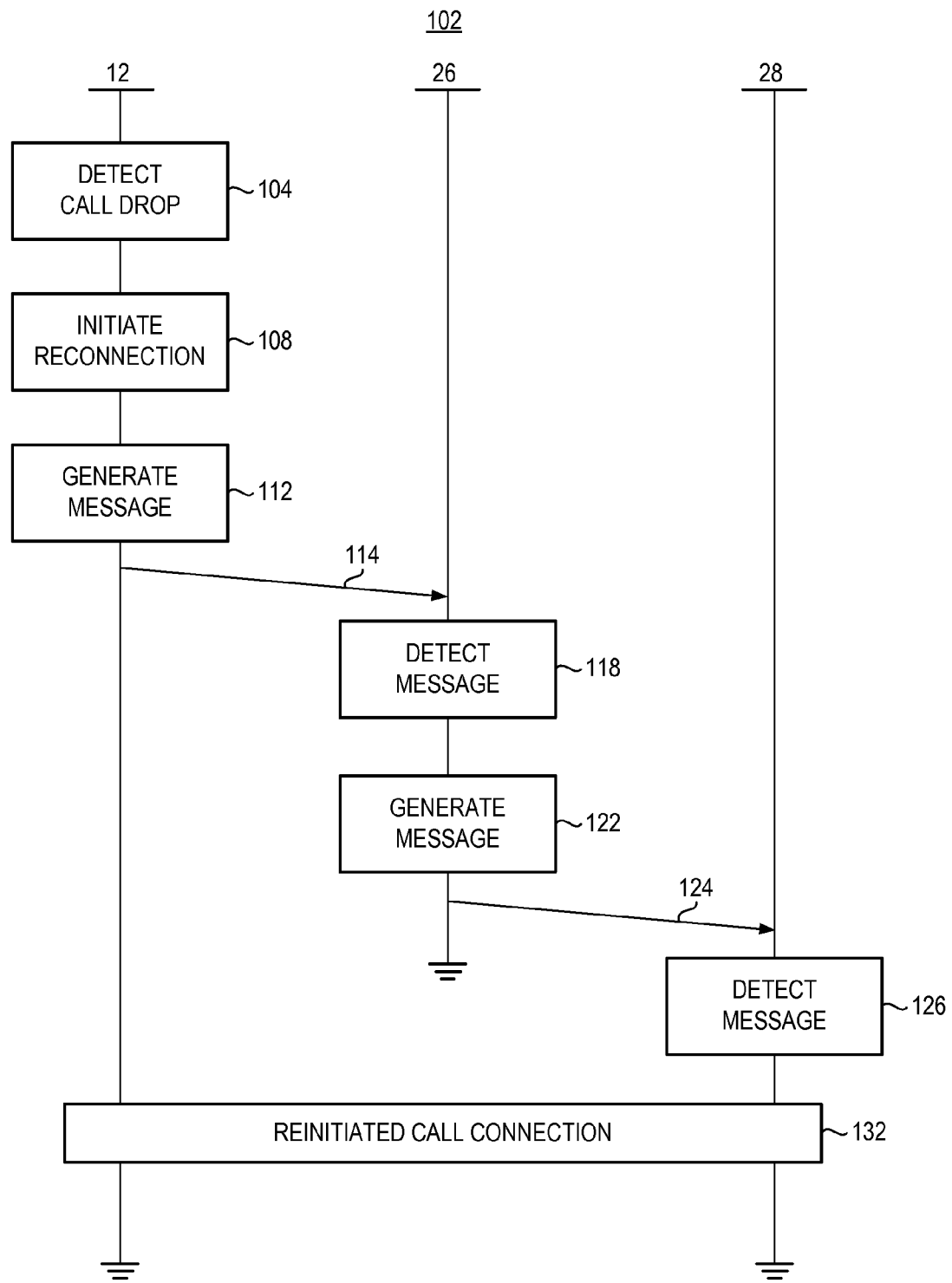
FIG. 2 illustrates a process diagram representative of the process of operation of an implementation of the present disclosure.

FIG. 2 illustrates a process 102 representative of the process of operation of an implementation of the present disclosure. The process facilitates reconnection of a dropped call of an ongoing communication. At a communication party, here the wireless device 12, detection is made of the call drop, indicated by the block 104. The call drop is of a conference call connection.

Responsive to the detection of the call drop, initiation of reconnection is commenced, indicated by the block 108. Here, a message is generated, indicated by the block 112, and sent, indicated by the segment 114, for delivery to a network server 26.

Detection is made, indicated by the block 118, at the network server. And, in response to the detection, a message is generated, indicated by the block 122 and sent, indicated by the segment 124, to a conference bridge server 28. The message is detected, indicated by the block 126, and the conference bridge forms a call connection with the device 12, indicated by the block 132. Thereby, the call is reconnected automatically responsive to detection of the call drop.

Figure 3:
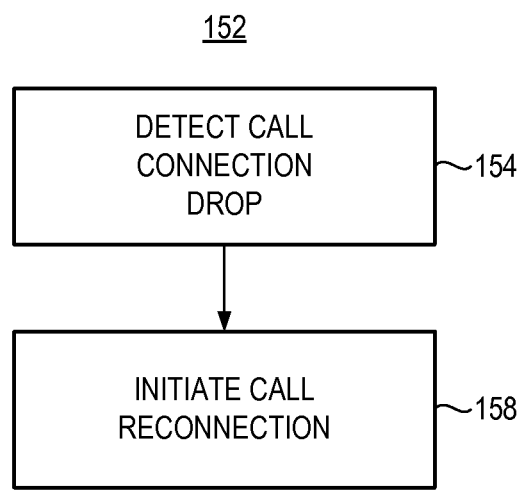
FIG. 3 illustrates a method flow diagram representative of the method of operation of an implementation of the present disclosure.

FIG. 3 illustrates a method flow diagram 152 representative of the method of operation of an implementation of the present disclosure. The method facilitates a telephonic call reconnection.

First, and as indicated by the block 154, a call connection drop of an ongoing telephonic call is detected. Then, and as indicated by the block 158, formation of the call connection is automatically reinitiated responsive to detection of the call connection drop of the ongoing call.

Automatic reconnection of a dropped call connection obviates the need of a user of the dropped communication party to undertake steps to reconnect the call connection.

Presently preferred implementations of the disclosure and many of improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. A wireless communication device, comprising:
   a control circuit configured to detect a dropped conference call due to unintentional call termination; and
   responsive to the detection, the control circuit further configured to automatically reinitiate connection of the dropped conference call by using conference call information accessed from calendar information relating to the dropped conference call.

2. The wireless communication device of claim 1 wherein the control circuit is further configured to detect a normal call termination comprising a remotely-initiated normal call termination.

3. The wireless communication device of claim 1 wherein the control circuit is further configured to detect a normal call termination comprising a locally-initiated normal call termination.

4. The wireless communication device of claim 1 wherein the control circuit is configured to reinitiate connection of the dropped conference call responsive to a network-acceptability level exceeding a threshold.

5. The wireless communication device of claim 1 wherein the control circuit is configured to reinitiate connection of the dropped conference call using last-entered dialing digits if the dropped conference call was a locally-originated conference call.

6. The wireless communication device of claim 1 wherein the control circuit is configured to reinitiate connection of the dropped conference call using last-received dialing digits if the dropped conference call was a remotely-originated conference call.

7. The wireless communication device of claim 1, wherein the conference call is made by way of a conference bridge and wherein the control circuit is configured to automatically reinitiate connection of the dropped conference call by way of the conference bridge.

8. The wireless communication device of claim 1 wherein the calendar information comprises information retrieved from a calendar and stored in temporal proximity to a time of the dropped conference call.

9. The wireless communication device of claim 7 wherein the control circuit is configured to send a network-terminated request to request a network-initiated call to the conference bridge.

10. The wireless communication device of claim 7 wherein the control circuit is configured to send a network-terminated data request to request a network-initiated call to the conference bridge, the network-initiated call including an indication that the network-initiated call is to reinitiate connection of the dropped conference call.

11. A method for facilitating a conference call reconnection, said method comprising:
   detecting a dropped conference call in response to detecting unintentional call termination; and
   responsive to detecting the dropped conference call, automatically reinitiating connection of the dropped conference call by using conference call information accessed from calendar information relating to the dropped conference call.

12. The method of claim 11 wherein said automatically reinitiating comprises reinitiating the connection of the dropped conference call using last-entered dialing digits if the dropped call was a locally-originated conference call.

13. The method of claim 11 wherein said automatically reinitiating comprises reinitiating the connection of the dropped conference call using last-received dialing digits if the dropped call was a remotely-originated conference call.

14. The method of claim 11 wherein the conference call is made by way of a conference bridge and wherein said automatically reinitiating connection of the dropped conference call comprises automatically reinitiating connection into the conference call by way of the conference bridge.

15. An apparatus for facilitating a conference call reconnection, said apparatus comprising:
   a detector configured to detect a network-terminated request to request a network initiated call to reinitiate formation of a conference call connection, the network-terminated request generated in response to detection of a drop of the conference call connection by detecting unintentional call termination; and a call reinitiation requestor configured to request reinitiation of the conference call connection, by using conference call information accessed from calendar information relating to the dropped conference call, responsive to detection made by said detector.

16. The wireless communication device of claim 1, wherein:

the control circuit is further configured to detect the dropped conference call during a call state; and the control circuit is further configured to preserve the call state at formation of the conference call connection.

17. The wireless communication device of claim 16, wherein the call state comprises a muted call connected over a Bluetooth audio path.

* * * * *